United States Patent
Elg et al.

(10) Patent No.: US 11,151,727 B2
(45) Date of Patent: Oct. 19, 2021

(54) IMAGE PROCESSING DEVICES WITH EFFICIENT MOTION BLUR DETECTION AND METHODS OF OPERATING SAME

(71) Applicant: SONY GROUP CORPORATION, Tokyo (JP)

(72) Inventors: Johannes Elg, Helsingborg (SE); Fredrik Mattisson, Lund (SE); Lars Novak, Bjärred (SE); Fredrik Olofsson, Lund (SE); Pal Szasz, Lund (SE)

(73) Assignee: SONY GROUP CORPORATION, Tokyo (JP)

( * ) Notice: Subject to any disclaimer, the term of this patent is extended or adjusted under 35 U.S.C. 154(b) by 1 day.

(21) Appl. No.: 16/629,590

(22) PCT Filed: Aug. 24, 2017

(86) PCT No.: PCT/US2017/048343
§ 371 (c)(1),
(2) Date: Jan. 9, 2020

(87) PCT Pub. No.: WO2019/040068
PCT Pub. Date: Feb. 28, 2019

(65) Prior Publication Data
US 2021/0150735 A1    May 20, 2021

(51) Int. Cl.
*G06K 9/00*    (2006.01)
*G06T 7/246*    (2017.01)
(Continued)

(52) U.S. Cl.
CPC .............. *G06T 7/246* (2017.01); *G06T 7/262* (2017.01); *G06T 7/292* (2017.01); *G06T 2207/20201* (2013.01)

(58) Field of Classification Search
CPC ............. H04N 5/2353; H04N 5/23229; H04N 5/23222; H04N 5/23251; H04N 5/23264;
(Continued)

(56) References Cited

U.S. PATENT DOCUMENTS 5,712,474 A * 1/1998 Naneda .............. H04N 5/23248
250/208.1
9,591,237 B2 * 3/2017 Acharya ................. G06T 5/002
(Continued)

OTHER PUBLICATIONS

Dash et al. "Motion blur parameters estimation for image restoration" Optik—International Journal for Light and Electron Optics 125(5):1634-1640 (21 pages) (Mar. 2014).
(Continued)

*Primary Examiner* — Shervin K Nakhjavan
(74) *Attorney, Agent, or Firm* — Myers Bigel, P.A.

(57) ABSTRACT

Image processing devices utilize computationally efficient operations based on exposure time and object speed to detect and estimate motion blur. These operations include determining, from a plurality of image frames of an object, a representative length of movement associated with at least one feature point of the object, which undergoes movement between the plurality of image frames. This representative length of movement is converted to an estimate of motion blur for a respective image frame, using operations that are function of length of movement and exposure time.

14 Claims, 7 Drawing Sheets

(51) Int. Cl.
*G06T 7/262* (2017.01)
*G06T 7/292* (2017.01)

(58) Field of Classification Search
CPC .. H04N 5/145; H04N 5/23212; H04N 5/2258; H04N 5/23232; H04N 5/2329; H04N 5/144; H04N 5/2356; H04N 5/2625; G06T 5/003; G06T 7/55; G06T 7/579; G06F 16/786

See application file for complete search history.

(56) References Cited

U.S. PATENT DOCUMENTS

| | | | | |
|---|---|---|---|---|
| 10,157,329 | B2* | 12/2018 | Oki | H04N 5/2353 |
| 2002/0149693 | A1 | 10/2002 | Tantalo et al. | |
| 2006/0098891 | A1* | 5/2006 | Steinberg | H04N 5/23254 |
| | | | | 382/255 |
| 2006/0177145 | A1* | 8/2006 | Lee | G06T 5/003 |
| | | | | 382/255 |
| 2007/0092244 | A1 | 4/2007 | Pertsel et al. | |
| 2007/0291155 | A1* | 12/2007 | Kawaguchi | H04N 5/232 |
| | | | | 348/333.12 |
| 2010/0013991 | A1* | 1/2010 | Miyazaki | G09G 3/3648 |
| | | | | 348/452 |
| 2011/0157459 | A1 | 6/2011 | Chen | |
| 2012/0121202 | A1* | 5/2012 | Wang | H04N 5/23277 |
| | | | | 382/255 |
| 2014/0132784 | A1* | 5/2014 | Chouly | G06T 7/20 |
| | | | | 348/208.1 |
| 2014/0218569 | A1* | 8/2014 | Tsubaki | H04N 5/23274 |
| | | | | 348/241 |
| 2014/0270348 | A1* | 9/2014 | Wagner | G06K 9/3241 |
| | | | | 382/103 |
| 2015/0138379 | A1* | 5/2015 | Auberger | H04N 5/23267 |
| | | | | 348/208.1 |
| 2015/0314452 | A1* | 11/2015 | Tateno | B25J 9/1697 |
| | | | | 700/259 |
| 2016/0330374 | A1* | 11/2016 | Ilic | H04N 5/23222 |
| 2017/0310901 | A1* | 10/2017 | Sheikh | H04N 5/23216 |
| 2020/0036883 | A1* | 1/2020 | Lee | H04N 5/23258 |

OTHER PUBLICATIONS

"Features from accelerated segment test" Wikipedia (5 pages) (Accessed on: Aug. 22, 2017).

"Kanade-Lucas-Tomasi feature tracker" Wikipedia (7 pages) (Accessed on: Aug. 22, 2017).

Notification of Transmittal of the International Search Report and the Written Opinion of the International Searching Authority, or the Declaration, in corresponding PCT Application No. PCT/US2017/048343 (dated Nov. 9, 2017).

Rosten et al. "Machine Learning for High-Speed Corner Detection" European Conference on Computer Vision (pp. 430-443) (2006).

Seibold et al. "Model-based Motion Blur Estimation for the Improvement of Motion Tracking" Computer Vision and Image Understanding 160:45-56 (Jul. 2017).

Tiwari et al. "Review of Motion Blur Estimation Techniques" Journal of Image and Graphics 1(4):176-184 (Dec. 2013).

* cited by examiner

IMAGE PROCESSING DEVICES WITH EFFICIENT MOTION BLUR DETECTION AND METHODS OF OPERATING SAME

CROSS REFERENCE TO RELATED APPLICATION

This application is a 35 U.S.C. § 371 national stage application of PCT International Application No. PCT/US2017/048343, filed on Aug. 24, 2017, the content of which is incorporated herein by reference in its entirety. The above-referenced PCT International Application was published in the English language as International Publication No. WO 2019/040068 A1 on Feb. 28, 2019.

FIELD OF THE INVENTION

The present invention relates to image processing devices and, more particularly, to image processing devices that support feature point tracking and methods of operating same.

BACKGROUND

Simultaneous Localization and Mapping (SLAM) based processing systems typically receive a stream of image frames of an object from an image capture device (e.g., camera) and then detect and track movement of features points of the object to determine estimates of position and orientation of the object. These feature points May be treated as specific locations on a two-dimensional (2D) image of a three-dimensional (3D) object that are significant for accurate representation, such as corners, edges, center points, etc. Unfortunately, the movement of feature points in a stream of images can lead to "motion blur", as described in articles by C. Seibold et al., entitled "*Model-based Motion Blur Estimation for the Improvement of Motion Tracking*," Computer Vision and Image Understanding 160 (2017), pp. 45-56, and S. Tiwari et al., entitled "*Review of Motion Blur Estimation Techniques*," Journal of Image and Graphics Vol. 1, No. 4, December 2013, pp. 176-184. As will be understood by those skilled in the art, the presence of motion blur in a 2D image frame may ruin the positioning quality of SLAM systems because motion blur makes feature points harder to match (since they look different) and less precise (since they are blurry), and thereby increases the likelihood of accumulating image drift.

Conventional image capture devices typically have three (3) main parameters that influence image quality and motion blur, which is typically treated as the apparent streaking of moving objects in a still image (or a sequence of images) when the image being recorded changes location during the recording of a single exposure (either due to rapid movement or long exposure). These main parameters include: ISO value, exposure time and aperture. Exposure time can significantly influence the motion blur associated with a captured image because the longer the exposure time, the greater a degree of motion blur for any moving object, regardless of ISO and aperture values. Nonetheless, exposure time is not, by itself, sufficient to predict motion blur or the absence of motion blur. For example, if neither the object nor the image capture device are moving relative to each other, then even a relatively long exposure time will not produce motion blur. On the other hand, even a very short exposure time (e.g., 1/500 second) may lead to exposure blur when the object and image capture device are moving at a high rate relative to each other.

Alternatively, image-only based blur estimation algorithms may be utilized to detect image blur, without requiring exposure time information. Unfortunately, such algorithms typically require the computationally-expensive processing of an entire image. Moreover, algorithms based solely on image content typically cannot ascertain whether a part of an image is blurry due to motion blur or whether the "blur" is caused by the nature of the object itself.

SUMMARY OF THE INVENTION

Image processing devices according to embodiments of the invention can utilize computationally efficient and high speed operations based on both exposure time and object speed to detect and estimate motion blur, which stems from the streaking of moving objects in a still image (or a sequence of images) when the image being recorded changes location during the recording of a single exposure (either due to rapid movement or long exposure). Advantageously, these operations do not require whole image processing or detailed analysis of image content.

In some of these embodiments of the invention, a method of detecting and estimating motion blur includes determining, from first and second image frames of an object, a representative length of movement associated with at least one feature point of the object, which undergoes movement between the first and second image frames. This representative length of movement is then converted to an estimate of motion blur associated with the first image frame, using a robust and computationally inexpensive algorithm, which may be performed in real time as images are captured/obtained.

In particular, the first and second frames of the object may be obtained/captured by an image capture device during respective first and second exposure time intervals, which are spaced apart in time by a frame-to-frame time interval, and the estimate of motion blur can be determined as a function of: (i) the first exposure time interval, (ii) the frame-to-frame time interval and (iii) the representative length of movement. In particular, the estimate of motion blur may be determined as proportional to $L_r(t_{e1})/(t_{ff})$, where $L_r$ is the representative length of movement, $t_{e1}$ is the first exposure time interval and $t_{ff}$ is the frame-to-frame time interval. For example, the estimate of motion blur may be determined as equal to the quantity $L_r(t_{e1})/(t_{ff})$.

According to additional embodiments of the invention, an image processing device, which may reside within or without an image capture device, may generate an audible and/or visual alert in the event the estimate of motion blur exceeds a motion blur threshold, which may be user adjustable. In addition, the image processing device may include a storage medium in the form of volatile and/or nonvolatile memory and operations may be performed to delete the first image frame from the storage medium in the event the estimate of motion blur exceeds a motion blur threshold. For example, the first and second image frames may be stored in volatile memory and the image processing device may delete the first image frame from the volatile memory (and possibly change an exposure time setting) in the event the estimate of motion blur exceeds the motion blur threshold. Alternatively, the first image frame may be transferred from the volatile memory to non-volatile memory in the event the estimate of motion blur is below the motion blur threshold.

According to still further embodiments of the invention, operations to determine a representative length of movement may include filtering a plurality of lengths of movement associated with a corresponding plurality of feature points of the object, which undergo movement between the first and second image frames, to thereby remove outliers. And, in some cases, these filtering operations may include filtering the plurality of lengths of movement using a mean plus standard deviation filtering criterion.

Image processing devices according to additional embodiments of the invention may include a microprocessor and a memory having image processing program code therein, which is readable by the microprocessor and executable therein. The image processing program code may include: (i) microprocessor-readable program code that evaluates a plurality of images of an object obtained during respective exposure time intervals, to thereby determine a representative length of movement associated with at least one feature point of the object, and (ii) microprocessor-readable program code that converts the representative length of movement to an estimate of motion blur associated with a first of the plurality of images. In some of these embodiments of the invention, the plurality of images include first and second images obtained by an image capture device during respective first and second exposure time intervals, which are spaced apart in time by a frame-to-frame time interval, and the microprocessor-readable program code may generate the estimate of motion blur as a function of: (i) the first exposure time interval, (ii) the frame-to-frame time interval and (iii) the representative length of movement. In particular, the estimate of motion blur may be determined as proportional to (or even equal to) $L_r (t_{e1})/(t_{ff})$, where $L_r$ is the representative length of movement, $t_{e1}$ is the first exposure time interval and $t_{ff}$ is the frame-to-frame time interval.

According to additional embodiments of the invention, a handheld cellular device is provided with a digital camera therein. The digital camera may include a lens, an image sensor optically coupled to the lens, a microprocessor and at least one memory having image processing program code therein that is readable by the microprocessor and executable therein. This image processing program code may include: (i) microprocessor-readable program code that evaluates a plurality of images of a object obtained by the digital camera during respective exposure time intervals, to thereby determine a representative length of movement associated with at least one feature point of the object, and (ii) microprocessor-readable program code that converts the representative length of movement to an estimate of motion blur associated with a first of the plurality of images. In particular, the image processing program code may include microprocessor-readable program code that evaluates first and second images of the object obtained by the digital camera during respective first and second exposure time intervals, which are spaced apart in time by a frame-to-frame time interval, to thereby determine a representative length of movement associated with a plurality of feature points of the object. And, the estimate of motion blur may be a function of: (i) the first exposure time interval, (ii) the frame-to-frame time interval and (iii) the representative length of movement. For example, the estimate of motion blur may be proportional to $L_r (t_{e1})/(t_{ff})$, where $L_r$ is the representative length of movement, $t_{e1}$ is the first exposure time interval and $t_{ff}$ is the frame-to-frame time interval. The image processing program code may also include microprocessor-readable program code that filters the plurality of lengths of movement to thereby remove outliers. This filtering may be based on a statistical criterion, such as a mean plus standard deviation statistical criterion.

According to still further embodiments of the invention, a handheld cellular device is provided, which includes a body having a digital camera therein with a lens, an image sensor optically coupled to the lens, a microprocessor and at least one memory having image processing program code therein that is readable by the microprocessor and executable therein. The microprocessor and the image processing program code are collectively configured to: (i) determine, from a plurality of image frames of an object developed at the image sensor, a representative length of movement associated with at least one feature point of the object, and (ii) convert the representative length of movement to an estimate of motion blur associated with a corresponding one of the plurality of image frames. In some of these embodiments of the invention, the plurality of image frames includes first and second image frames developed at the image sensor during respective first and second exposure time intervals, which are spaced apart in time by a frame-to-frame time interval. In addition, the estimate of motion blur associated with the first image frame is a function of: (i) the first exposure time interval, (ii) the frame-to-frame time interval and (iii) a representative length of movement associated with movement of the at least one feature between the first and second image frames. In particular, the estimate of motion blur associated with the first image frame may be proportional to (or equal to) $L_r (t_{e1})/(t_{ff})$, where $L_r$ is the representative length of movement, $t_{e1}$ is the first exposure time interval and $t_{ff}$ is the frame-to-frame time interval. The digital camera may also be configured to generate an audible and/or visual alert in the event the estimate of motion blur exceeds a motion blur threshold.

DETAILED DESCRIPTION OF EMBODIMENTS

Figure 1A:
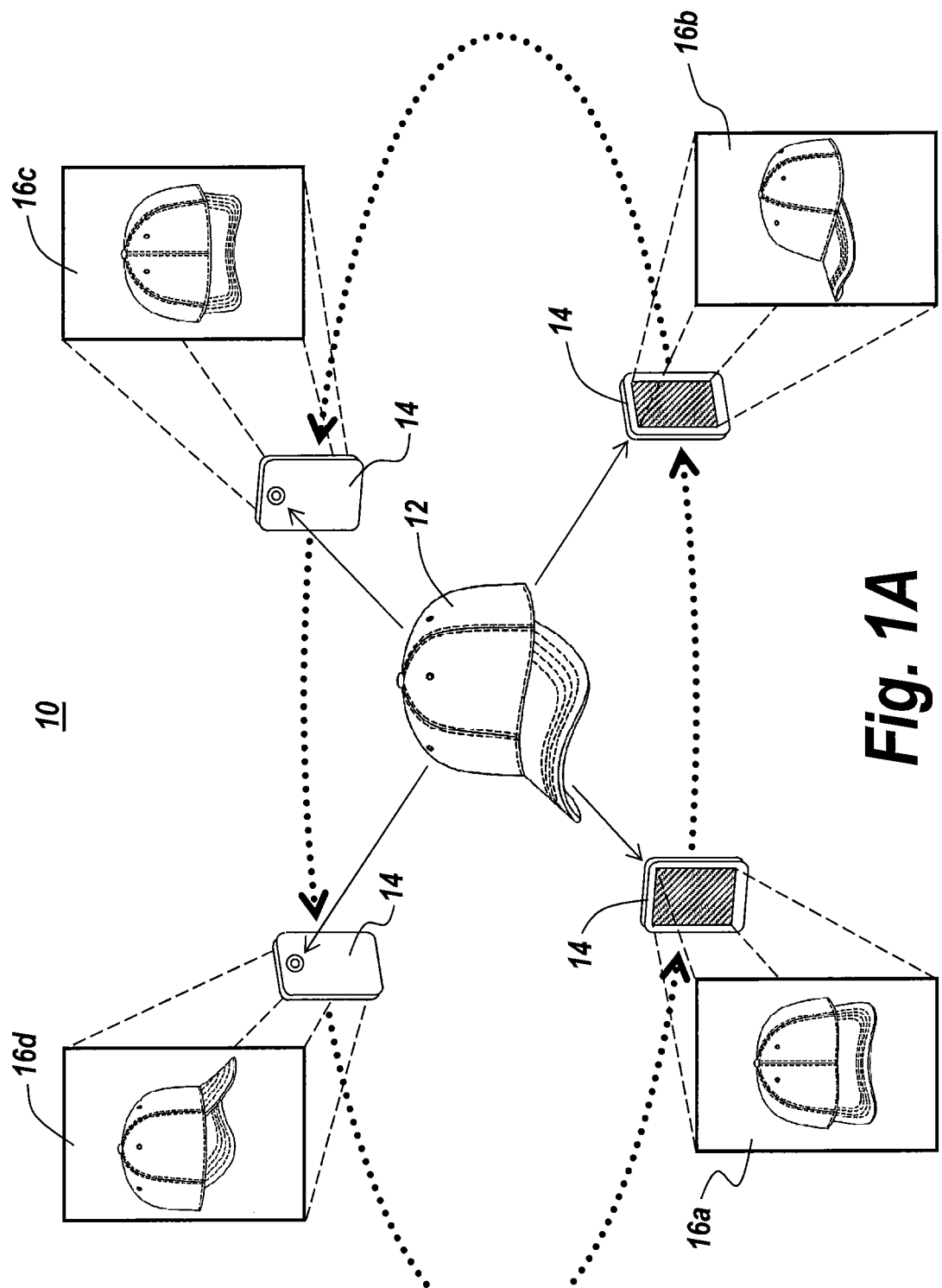
FIG. 1A is a perspective view of a three-dimensional (3D) object undergoing a 360° scan by an image capture device with motion blur detection and estimation capability, according to embodiments of the present invention.

The present invention now will be described more fully with reference to the accompanying drawings, in which preferred embodiments of the invention are shown. This invention may, however, be embodied in many different forms and should not be construed as being limited to the embodiments set forth herein; rather, these embodiments are provided so that this disclosure will be thorough and complete, and will fully convey the scope of the invention to those skilled in the art. Like reference numerals refer to like elements throughout.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the present invention. As used herein, the singular forms "a," "an" and "the" are intended to include the plural forms as well, unless the context clearly indicates otherwise. It will be further understood that the terms "comprising", "including", "having" and variants thereof, when used in this specification, specify the presence of stated features, steps, operations, elements, and/or components, but do not preclude the presence or addition of one or more other features, steps, operations, elements, components, and/or groups thereof. In contrast, the term "consisting of" when used in this specification, specifies the stated features, steps, operations, elements, and/or components, and precludes additional features, steps, operations, elements and/or components.

Example embodiments are described herein with reference to block diagrams and/or flowchart illustrations of computer-implemented methods, apparatus (systems and/or devices) and/or computer program products. It is understood that any block within the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions, which implement the functions/acts specified in the block diagrams and/or flowchart block or blocks.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Referring now to FIG. 1A, operations to perform a 360° image scan 10 of a three-dimensional (3D) object 12 may include utilizing an image capture device 14 to obtain/capture a plurality of images 16a-16d of the object 12 at different points of perspective around the object 12, as shown. Customarily, this scan 10 may include moving the image capture device 14 in a closed-loop around the object 12 at a relatively constant rate, which is sufficiently slow to preclude excessive image blur, and at a relatively constant focus distance (e.g., radius). If necessary, repeated image capture along one or more arcs of the circle may be performed to complete the image scan 10, particularly if any of the captured images (e.g., 16a-16d) are corrupted because of the presence of excessive image blur and deleted, as explained more fully hereinbelow.

Figure 1B:
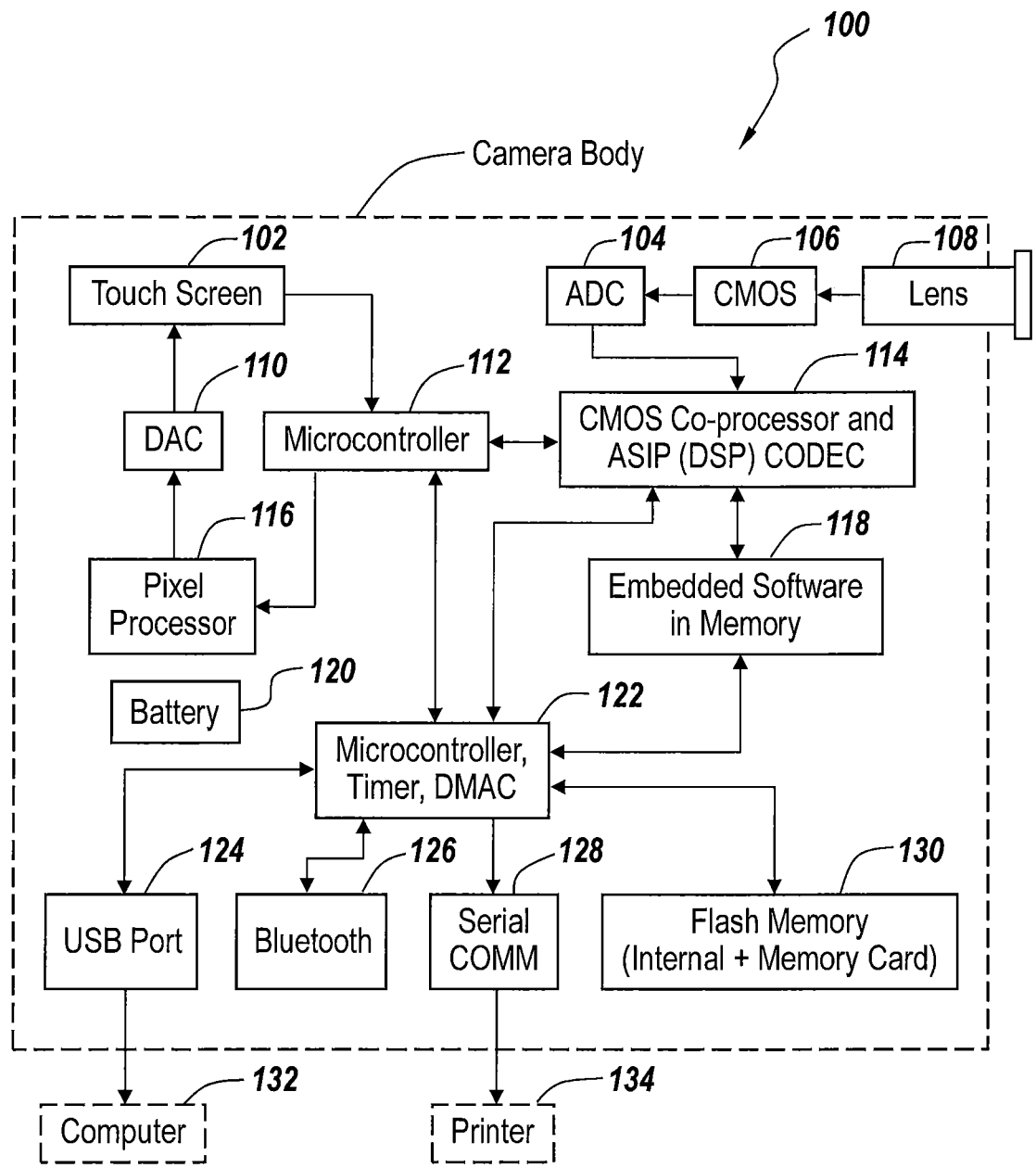
FIG. 1B is a block diagram of an image capture device with motion blur detection and estimation capability, which may be used during the 360° image scan illustrated by FIG. 1A, according to embodiments of the present invention.

As illustrated by FIG. 1B, an embodiment of the image capture device 14 of FIG. 1A, which possesses both image capture capability and substantial post capture image processing capability, is shown as a potentially handheld device containing digital camera components embodied within a camera body. This image capture and image processing device 100, which may be embodied as a cellular device (e.g., smart phone), can include a menu-driven touch screen (with image display) 102, a camera lens 108, memory 118, 130, a battery 120 and various additional processing circuitry, which can communicate with external devices, such as a computer 132 (via a USB port 124 and/or bluetooth port 126) and a printer (via a serial communications port 128 and/or bluetooth port 126). Alternatively, in some embodiments of the invention, the image capture and image processing device 100 may be embodied as a plurality of discrete devices that perform respective image capture and image processing operations, which may be physically and/or temporally spaced apart.

The additional processing circuitry illustrated by FIG. 1B can include a CMOS image sensor 106, which can receive an image of an object developed through the lens 108, and an analog-to-digital converter (ADC) 104, which converts analog image signals developed at the image sensor 106 into digital signals, which are provided to an image co-processor and application-specific instruction set processor (ASIP) 114, which, among other things, performs digital signal processing (DSP) and coder-decoder (CODEC) operations and operates under control of embedded software (including firmware). This software may be provided as microprocessor-readable image capture program code and image processing program code within the memory 118. In addition, microcontrollers 112, 122 with timers and direct memory access control (DMAC) are provided with access to: internal and removable flash memory 130, the image co-processor and ASIP 114, and a touch screen pixel processor 116, which drives the touch screen 102 via a digital-to-analog converter (DAC) 110.

Figure 2A:
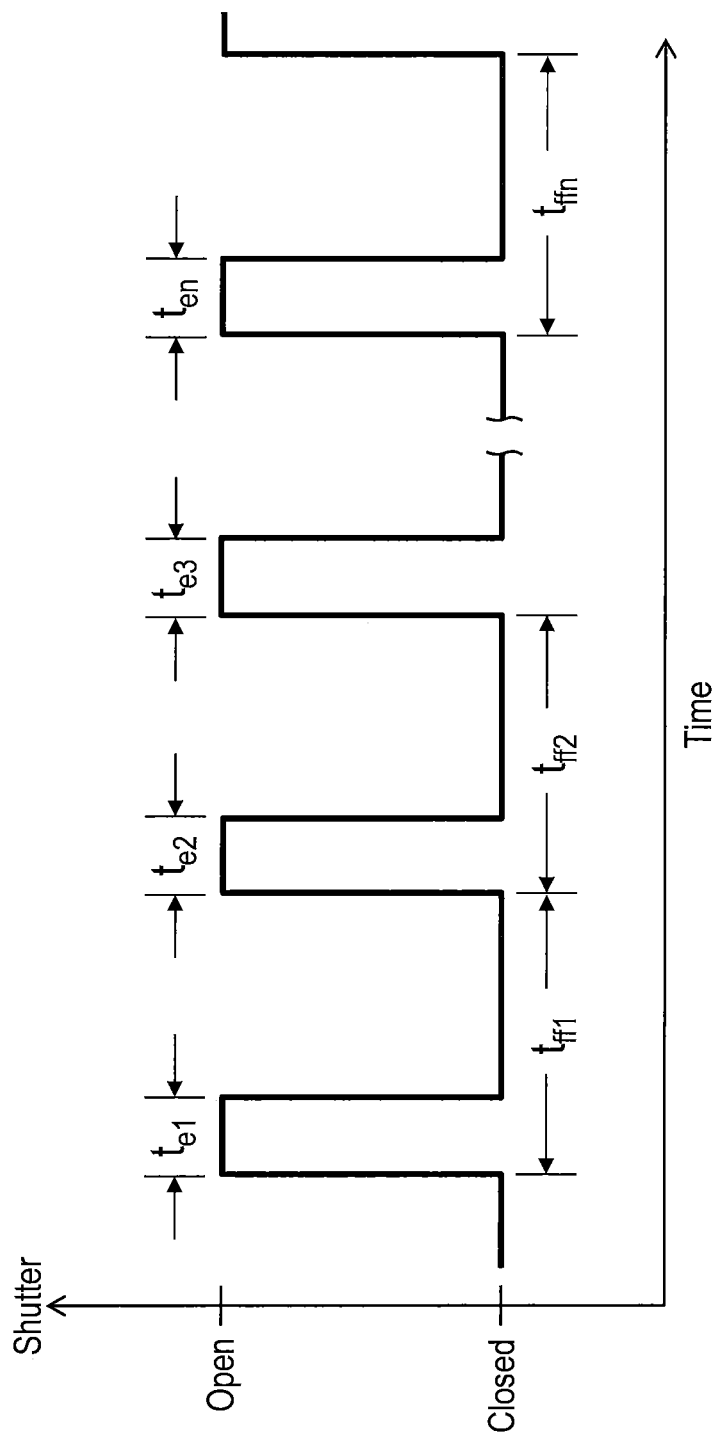
FIG. 2A is a timing diagram that illustrates a sequence of image frame capture operations, which may be performed during the 360° image scan illustrated by FIG. 1A, according to embodiments of the invention.

Referring now to FIG. 2A, the image capture and image processing device 100 of FIG. 1B may utilize the image co-processor and ASIP 114, which operates under control of the image processing program code (within memory 118), to obtain/capture a plurality of consecutive image frames of an object as digital images developed through the lens 108 and onto the CMOS image sensor 106 during respective exposure time intervals $t_{e1}$-$t_{en}$, which are spaced apart in time relative to each other by corresponding frame-to-frame time intervals $t_{f1}$-$t_{fn}$. Thus, if the image capture and image processing device 100 is set to an image frame rate of 10 frames-per-second, with an exposure speed of 1/100 of a second when the shutter is open, then the width of each $t_{e1}$-$t_{en}$ "pulse" relative to the frame-to-frame time interval $t_{ff1}$-$t_{ffn}$ will be: 0.1 (i.e., $t_{e1}/t_{ff}$=(0.01)/(0.1)=0.1).

Figure 2B:
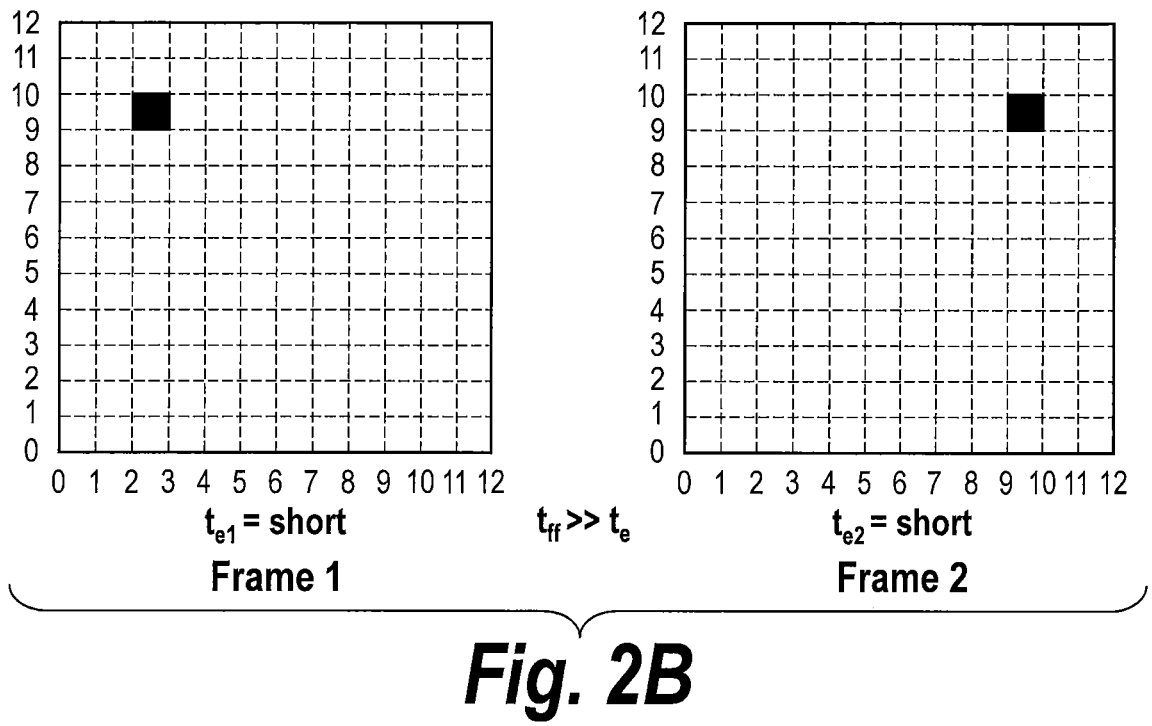
FIGS. 2B-2C are graphs that illustrate motion blur detection and estimation operations, according to embodiments of the present invention.

Moreover, as shown by FIG. 2B, in the event the exposure time interval is very short relative to the frame-to-frame time interval (i.e., $t_{ff}$>>$t_e$), then even the movement of an exemplary feature point of an object across 7 horizontal pixels during a single frame-to-frame time interval will yield no appreciable motion blur within the first captured frame (Frame 1). This is because the quantity 7($t_e/t_{ff}$) is very small because $t_e$<<$t_f$. For purposes of illustration only and for ease of understanding, the exemplary feature point is highlighted as a pixel-sized black box that moves at a constant speed relative to an image camera device, and within a 12×12 image frame containing 144 image pixels (see, e.g., image sensor 106).

Figure 2C:
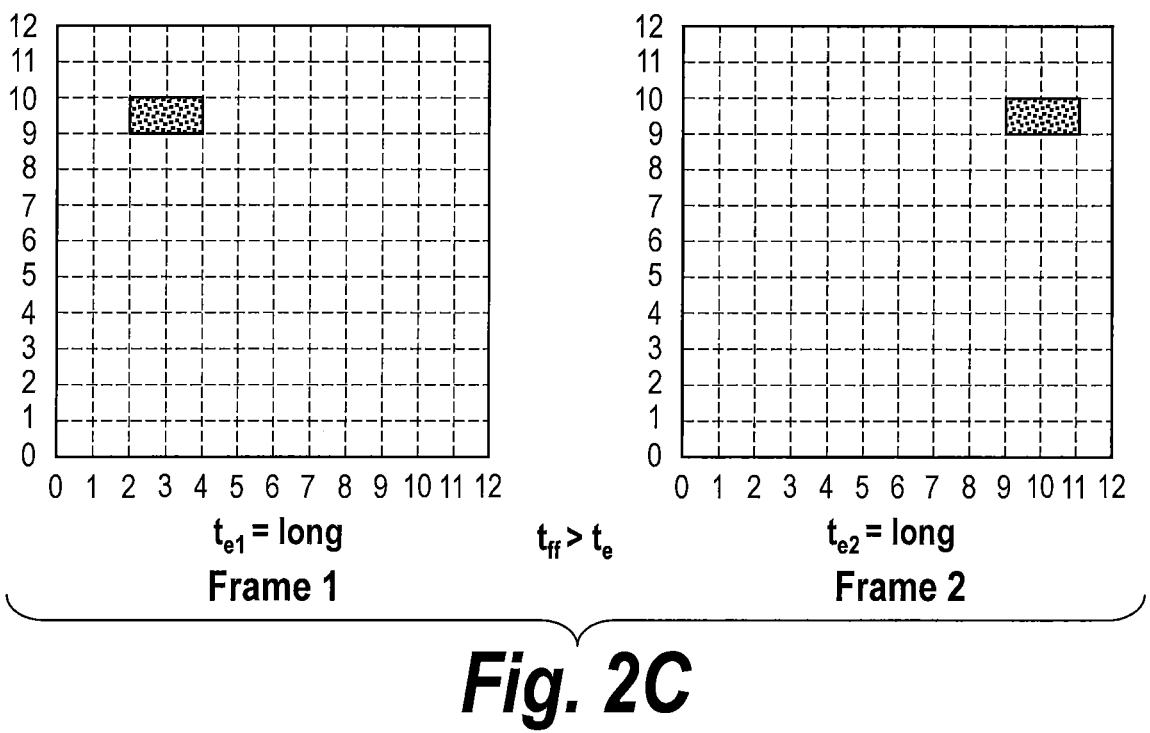

In stark contrast, and as shown by FIG. 2C, if the exposure time interval is relatively long (i.e., $t_{e1}$=$t_{e2}$=long), then even if the frame-to-frame time interval is greater than the exposure time interval (e.g., $t_e$≈0.3($t_{ff}$)), the movement of an exemplary feature point of an object across 7 horizontal pixels during a single frame-to-frame time interval may yield an appreciable amount of motion blur within a captured image frame. This image blur is highlighted by a "shaded" feature point occupying two (2) adjacent pixels in each captured image frame. In other words, because $t_e$≈0.3 ($t_{ff}$) and a representative length of movement ($L_r$) of the feature point is equal to 7 pixels, the motion blur associated with Frame 1 in FIG. 2C may be represented as two (2) pixels, where: 7($t_e/t_{ff}$)≈2. This amount of image blur may be treated as excessive if the image blur value of 2 exceeds a predetermined (e.g., user and/or algorithm specified) motion blur threshold.

Figure 3:
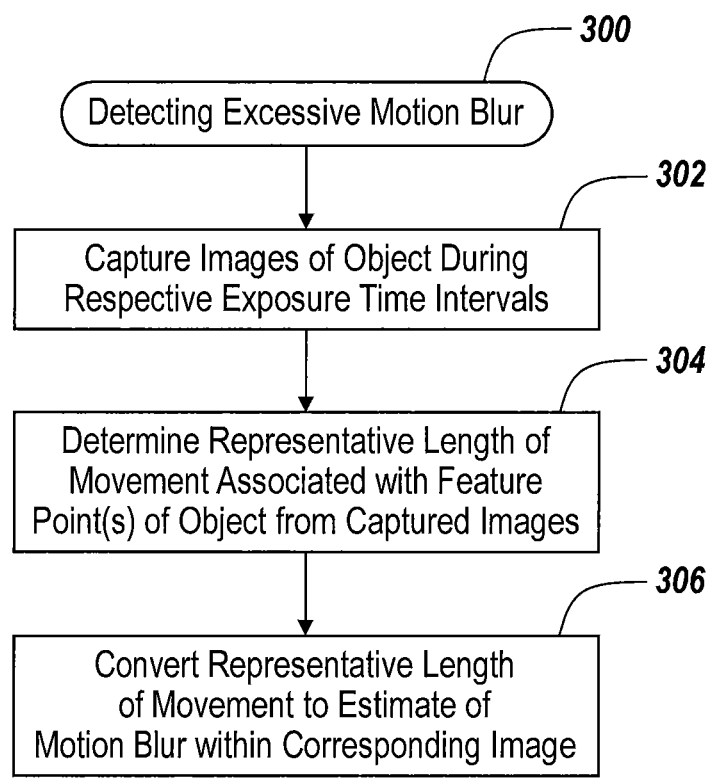
FIG. 3 is a flow diagram of operations for detecting and estimating motion blur, according to embodiments of the present invention.

The motion blur detection and estimation operations described in the simplified example of FIGS. 2A-2C are further highlighted by the motion blur detection and estimation operations 300 of FIG. 3, which include capturing a plurality of images of an object (in sequence) during respective exposure time intervals (e.g., $t_{e1}$, $t_{e2}$, ..., $t_{en}$), Block 302. As will be understood by those skilled in the art, this capture of images may be performed by the aforementioned processing circuitry within an image capture and image processing device 100, to thereby yield a plurality of image frames of the object. Thereafter, as shown by Block 304, operations are performed to determine a representative length of movement ($L_r$) associated with one or more feature points of an object, from the image frames, which may be stored in volatile and/or nonvolatile memory within the image capture and image processing device 100. These operations may include using an object corner detection method to extract feature points, such as a Features from Accelerated Segment Test (FAST) method, which is disclosed in an article by E. Rosten et al., entitled *"Machine Learning for High-Speed Corner Detection,"* European Conference on Computer Vision (2006), pp. 430-443, and a feature point tracking method, such as a Kanade-Lucas-Tomasi (KLT) feature tracker.

Finally, as shown by Block 306, operations are then performed to convert the representative length of movement ($L_r$) to an estimate of motion blur within a corresponding image frame. Typically, these operations will be performed across a plurality of sequentially captured images to thereby determine a corresponding length of movement and corresponding motion blur estimate for each image frame. And, these operations may be advantageously performed in real time as images are being sequentially captured (e.g., in volatile memory) so that a "keep"/"delete" decision can be made on each image frame before further operations and possibly more computationally expensive operations are performed and non-volatile is utilized for storage. Nonetheless, in alternative embodiments of the invention, the operations illustrated and described herein may be performed across a plurality of independent image capture and image processing devices, which may be separated physically and perform temporally spaced operations. In this manner, image processing devices may obtain and perform further processing on image frames of objects, which were originally captured by an independent and possibly remotely located image capture device (e.g., digital camera, cellular device, etc.).

Figure 4:
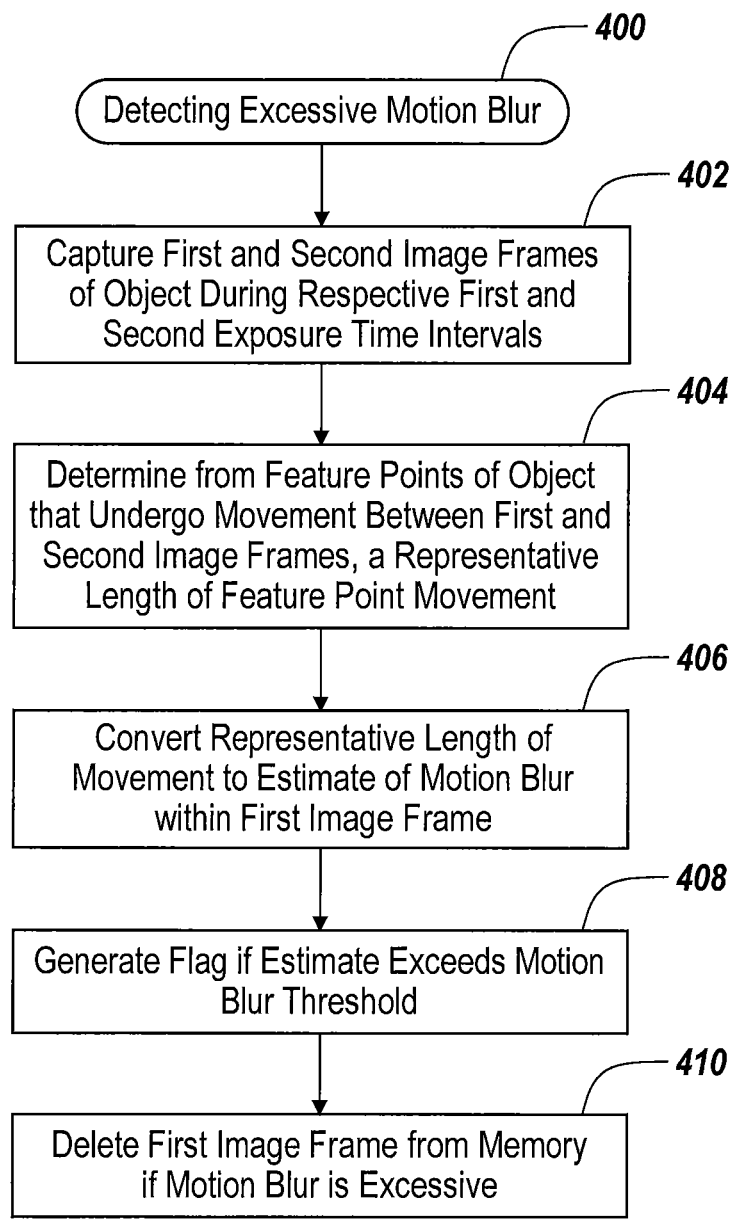
FIG. 4 is a flow diagram of operations for detecting and estimating motion blur, according to embodiments of the present invention.

Referring now to FIG. 4, additional embodiments of the invention include operations 400 to detect and estimate degrees of motion blur during image processing. As shown by Blocks 402, 404 and 406, and described hereinabove, operations can be performed to: (i) capture/obtain first and second image frames of an object being scanned during respective first and second exposure time intervals, which for proper image exposure may be functions of an ISO setting and aperture setting of an image capture device; (ii) determine a representative length of movement associated with a plurality of feature points of the object that undergo movement between the first and second image frames; and (iii) convert the representative length of movement to an estimate of motion blur within the first image frame. In addition, operations may be performed to generate a "flag" in the event the estimate of motion blur exceeds a predetermined motion blur threshold, Block 408. In some embodiments of the invention, this "flag" may take the form of a signal that initiates automatic deletion of a corresponding image frame from memory, Block 410, and/or communicates an audible and/or visual alert that excessive blur has been detected, which may then prompt a user of a handheld image capture device to rescan a portion of the object being evaluated.

Figure 5:
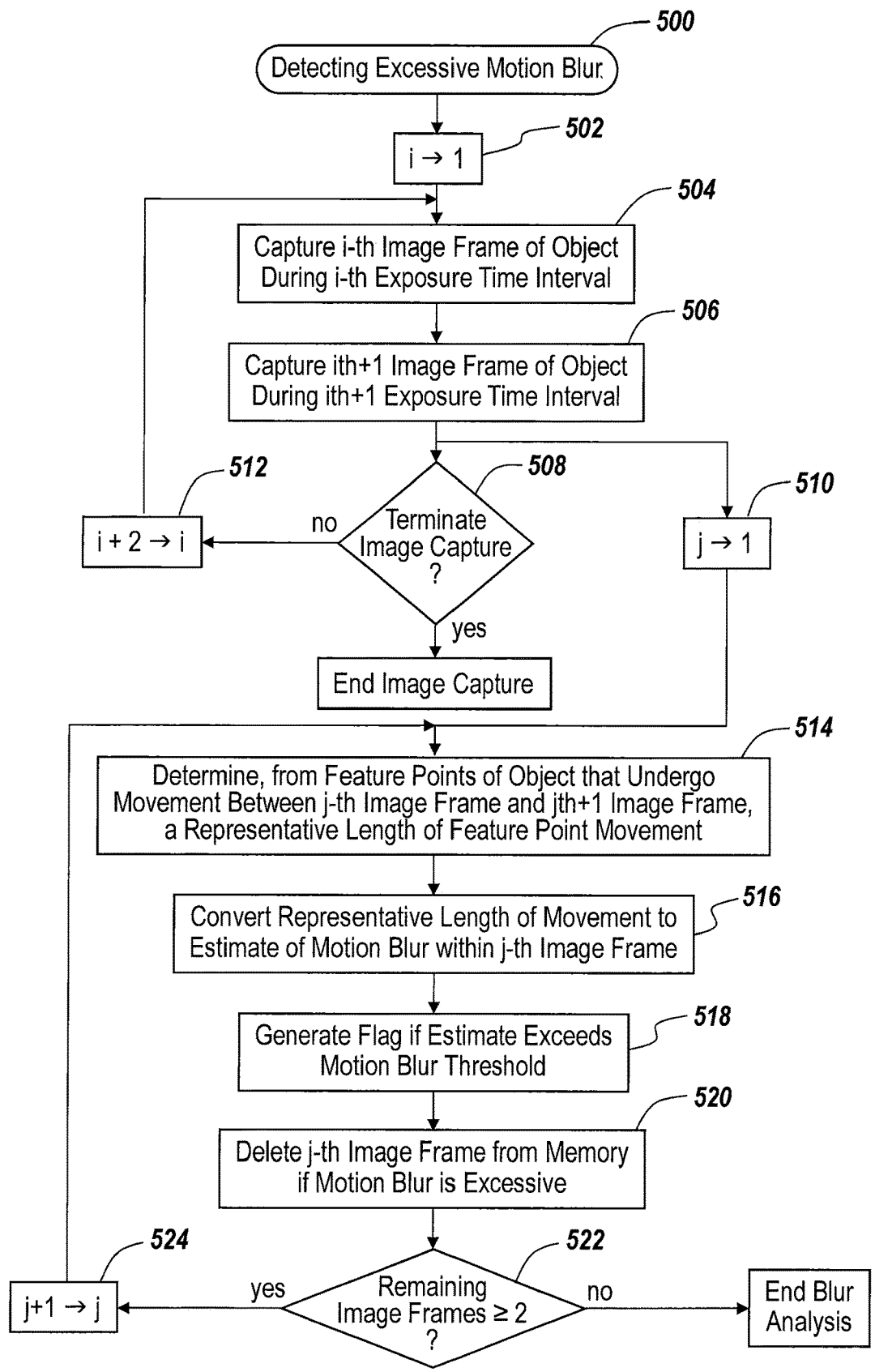
FIG. 5 is a flow diagram of operations for detecting and estimating motion blur, according to embodiments of the present invention.

Referring now to FIG. 5, operations 500 to detect and estimate motion blur according to additional embodiments of the invention include operations to capture image frames of an object being scanned, Blocks 502-508 and 512, and then process the image frames (e.g., either in real-time during scanning or subsequently during post processing) to determine (and act on) estimates of image blur, Blocks 510 and 514-524. Thus, as shown by Block 502, a counter may be initialized and then incremented (Block 512) as consecutive image frames are captured during respective exposure time intervals, Blocks 504, 506. These operations may continue in sequence until terminated, Block 508 (or otherwise temporarily suspended in response to a full buffer memory, etc.).

However, as shown by Block 510, the operations associated with Blocks 514-524 may commence (e.g., in parallel with image capture operations) once at least two image frames have been captured. Thus, as shown by Blocks 514 and 522-524, operations may be performed, in sequence, to determine (for a pair of previously captured image frames) a representative length of feature point movement associated with each respective image frame. As will be understood by those skilled in the art, such operations may include filtering a plurality of lengths of movement associated with a corresponding plurality of feature points of an object to remove outliers, such as by initially filtering the plurality of lengths of movement using a mean plus standard deviation filtering criterion. Other filtering criterion may also be used in alternative embodiments of the invention. Thereafter, as shown by Blocks 516-522, computationally efficient estimates of motion blur may be determined as respective functions of exposure time interval, frame-to-frame time interval and a representative length of movement, as described hereinabove with respect to FIGS. 2A-2C, and one or more alerts may be automatically generated and acted upon in the event excessive motion blur is detected.

Accordingly, as described hereinabove, estimates of the pixels-per-frame movement of feature points in a 2D coordinate system can be efficiently generated from just two consecutive image frames, using computationally inexpensive and high speed operations, which may be performed in real time with image capture operations. Moreover, the movement of many feature points can be summarized into a single value, which may assume a worst case scenario yet be relatively unaffected by outliers. For example, a mean plus standard deviation of the "pixel speeds" of all feature points may be used to calculate a single representative value (i.e., representative length of movement). If this value is assumed to be 10 pixels per frame at a steady state image processing frame rate of 30 frames/second, then the 10 pixel length of movement ($L_r$) will have occurred during a frame-to-frame time interval of ⅓₀ seconds (i.e., $t_{ff}$=33 milliseconds). Then, to estimate a motion blur amount associated with the first of the two frames, a ratio of frame exposure time ($t_e$) to frame-to-frame time interval (i.e., $t_e/t_{ff}$) is multiplied by the representative length of feature point movement ($L_r$). This means that if the frame exposure time is 10 milliseconds, the corresponding motion blur can be estimated as: 10 pixels times the ratio of (10 ms/33 ms), which yields an image blur estimate of approximately 3 pixels for the first image frame.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method of estimating motion blur, comprising:
    determining, from first and second image frames of an object, a representative length of movement associated with at least one feature point of the object that undergoes movement between the first and second image frames; and
    converting the representative length of movement to an estimate of motion blur associated with the first image frame;
    wherein the first and second image frames of the object are obtained by an image capture device during respective first and second exposure time intervals, which are spaced apart in time by a frame-to-frame time interval;
    wherein said converting comprises generating the estimate of motion blur as a function of: (i) the first exposure time interval, (ii) the frame-to-frame time interval and (iii) the representative length of movement; and
    wherein the estimate of motion blur is proportional to $L_r$ ($t_{e1}$)/($t_{ff}$), where $L_r$ is the representative length of movement, $t_{e1}$ is the first exposure time interval and $t_{ff}$ is the frame-to-frame time interval.

2. The method of claim 1, wherein the estimate of motion blur equals $L_r$ ($t_{e1}$)/($t_{ff}$).

3. The method of claim 1, wherein said converting is followed by generating an audible and/or visual alert in the event the estimate of motion blur exceeds a motion blur threshold.

4. The method of claim 1, wherein the first and second image frames are stored within a storage medium; and wherein said converting is followed by deleting the first image frame from the storage medium in the event the estimate of motion blur exceeds a motion blur threshold.

5. The method of claim 1, wherein the first and second image frames are stored in volatile memory within the image capture device during said converting; and wherein said converting is followed by deleting the first image frame from the volatile memory in the event the estimate of motion blur exceeds a motion blur threshold.

6. The method of claim 1, wherein the first and second image frames are stored in volatile memory within the image capture device during said converting; and wherein said converting is followed by transferring the first image frame from the volatile memory to nonvolatile memory in the event the estimate of motion blur is below a motion blur threshold.

7. The method of claim 1, wherein said determining comprises filtering a plurality of lengths of movement associated with a corresponding plurality of feature points of the object that undergo movement between the first and second image frames, to thereby remove outliers.

8. The method of claim 7, wherein said filtering comprises filtering the plurality of lengths of movement using a mean plus standard deviation filtering criterion.

9. The method of claim 1, wherein said converting is followed by changing an exposure time interval setting within the image capture device in the event the estimate of motion blur exceeds a motion blur threshold.

10. An image processing device, comprising:
    a microprocessor; and
    a memory having image processing program code therein that is readable by said microprocessor and executable therein, said image processing program code comprising microprocessor-readable program code configured to cause the image processing device to:
        evaluate a plurality of images of an object obtained during respective exposure time intervals, to thereby determine a representative length of movement associated with at least one feature point of the object; and
        convert the representative length of movement to an estimate of motion blur associated with a first of the plurality of images;
    wherein the plurality of images include first and second images obtained by an image capture device during respective first and second exposure time intervals, which are spaced apart in time by a frame-to-frame time interval;
    wherein said microprocessor-readable program code that converts comprises microprocessor-readable program code that generates the estimate of motion blur as a function of: (i) the first exposure time interval, (ii) the frame-to-frame time interval and (iii) the representative length of movement; and
    wherein the estimate of motion blur is proportional to $L_r$ ($t_{e1}$)/($t_{ff}$), where $L_r$ is the representative length of movement, $t_{e1}$ is the first exposure time interval and $t_{ff}$ is the frame-to-frame time interval.

11. An handheld cellular device, comprising:
    a body having a digital camera therein, said digital camera comprising a lens, an image sensor optically coupled to the lens, a microprocessor and at least one memory having image processing program code therein that is readable by said microprocessor and executable therein, said image processing program code comprising:

microprocessor-readable program code that evaluates a plurality of images of a object obtained by the digital camera during respective exposure time intervals, to thereby determine a representative length of movement associated with at least one feature point of the object; and microprocessor-readable program code that converts the representative length of movement to an estimate of motion blur associated with a first of the plurality of images; and microprocessor-readable program code that deletes the first image of the object from the at least one memory in response to determining that the estimate of motion blur exceeds a motion blur threshold.

12. The device of claim 11, wherein said microprocessor-readable program code that evaluates comprises microprocessor-readable program code that evaluates first and second images of the object obtained by the digital camera during respective first and second exposure time intervals, which are spaced apart in time by a frame-to-frame time interval, to thereby determine a representative length of movement associated with a plurality of feature points of the object; and wherein the estimate of motion blur is a function of: (i) the first exposure time interval, (ii) the frame-to-frame time interval and (iii) the representative length of movement.

13. The device of claim 12, wherein the estimate of motion blur is proportional to $L_r (t_{e1})/(t_{ff})$, where $L_r$ is the representative length of movement, $t_{e1}$ is the first exposure time interval and $t_{ff}$ is the frame-to-frame time interval.

14. The device of claim 11, wherein said microprocessor-readable program code that evaluates comprises microprocessor-readable program code that evaluates first and second images of the object obtained by the digital camera to thereby determine a plurality of lengths of movement associated with a plurality of feature points of the object; and wherein said image processing program code further comprises microprocessor-readable program code that filters the plurality of lengths of movement to thereby remove outliers.

* * * * *